A. A. ST. CLAIR.
AIR BRAKE.
APPLICATION FILED NOV. 26, 1907.
899,844.
Patented Sept. 29, 1908.
7 SHEETS—SHEET 1.
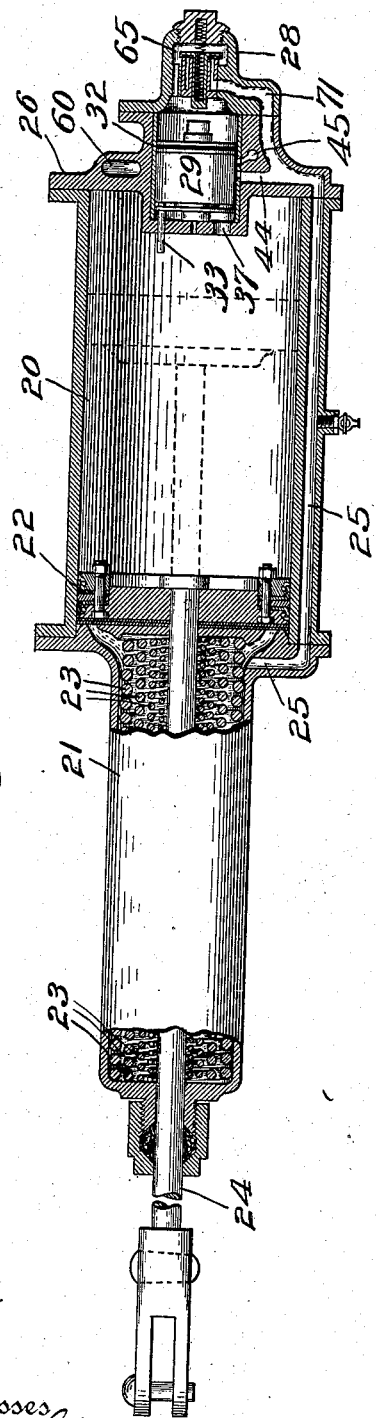
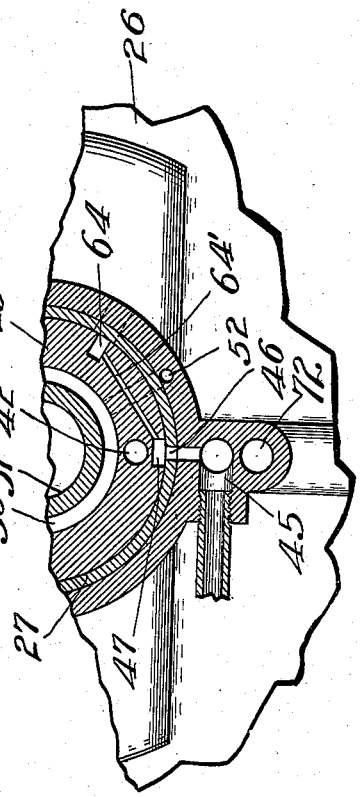
Witnesses
Frank A. Fahle
Thomas W. McMeans
Inventor
Augustus A. St Clair
By Bradford Hood
Attorneys

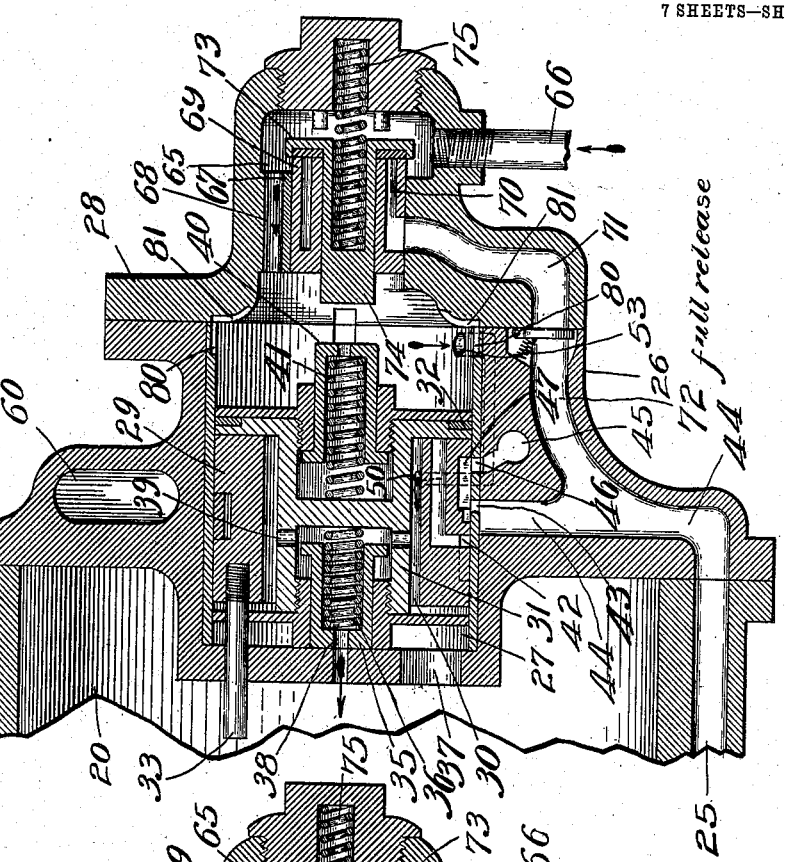
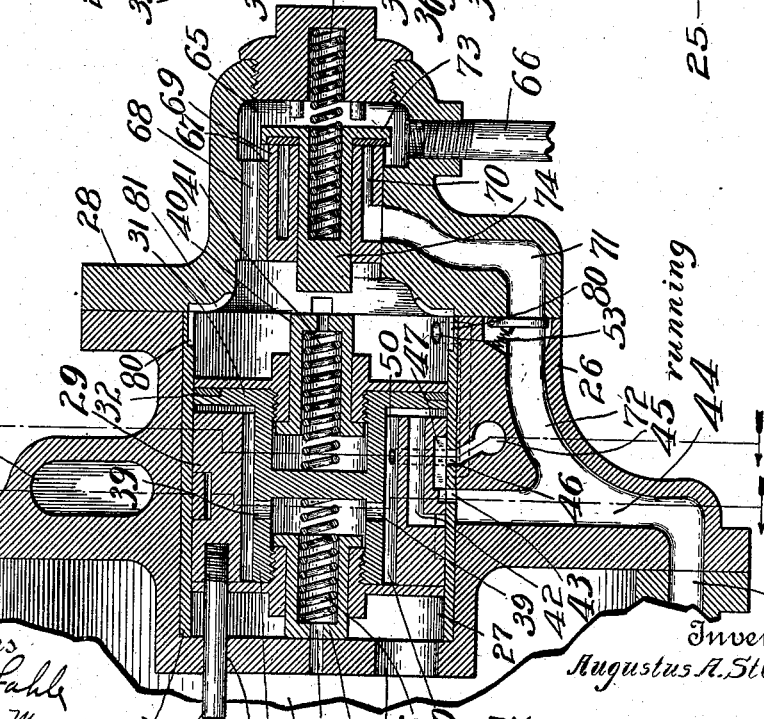

A. A. ST. CLAIR.
AIR BRAKE.
APPLICATION FILED NOV. 26, 1907.
899,844.
Patented Sept. 29, 1908.
7 SHEETS—SHEET 3.
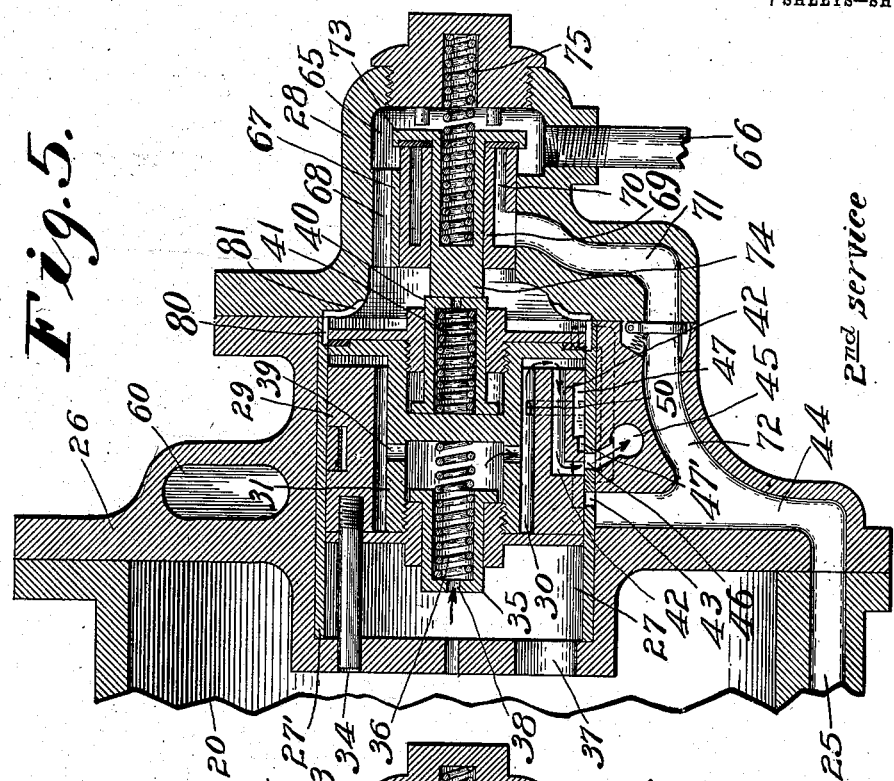
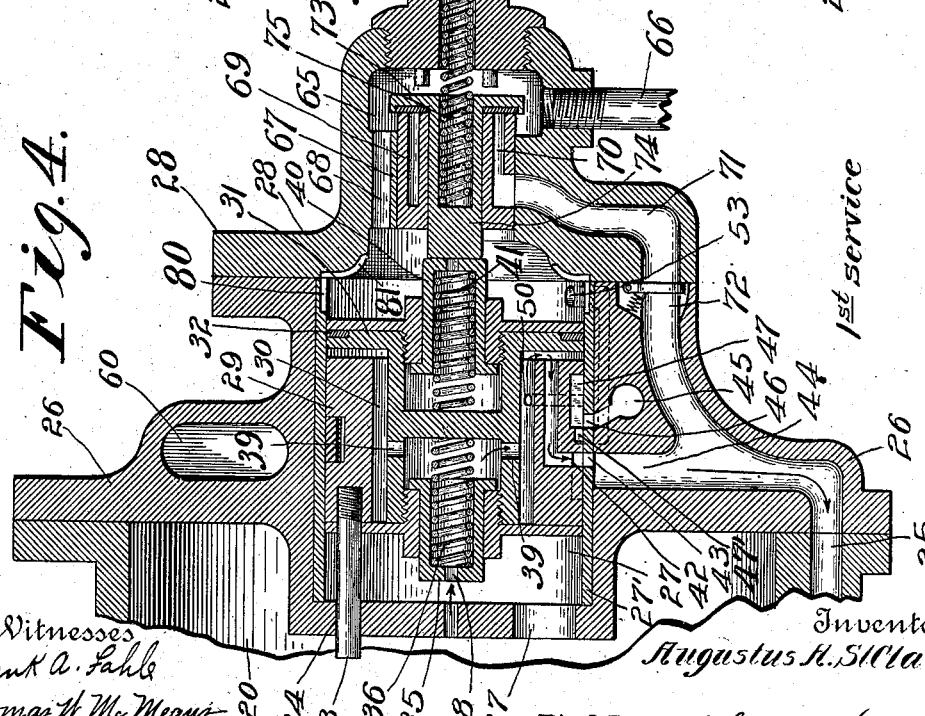
Witnesses
Frank A. Fahle
Thomas W. McMeans
Inventor
Augustus A. St.Clair
By Bradford + Hood
Attorneys

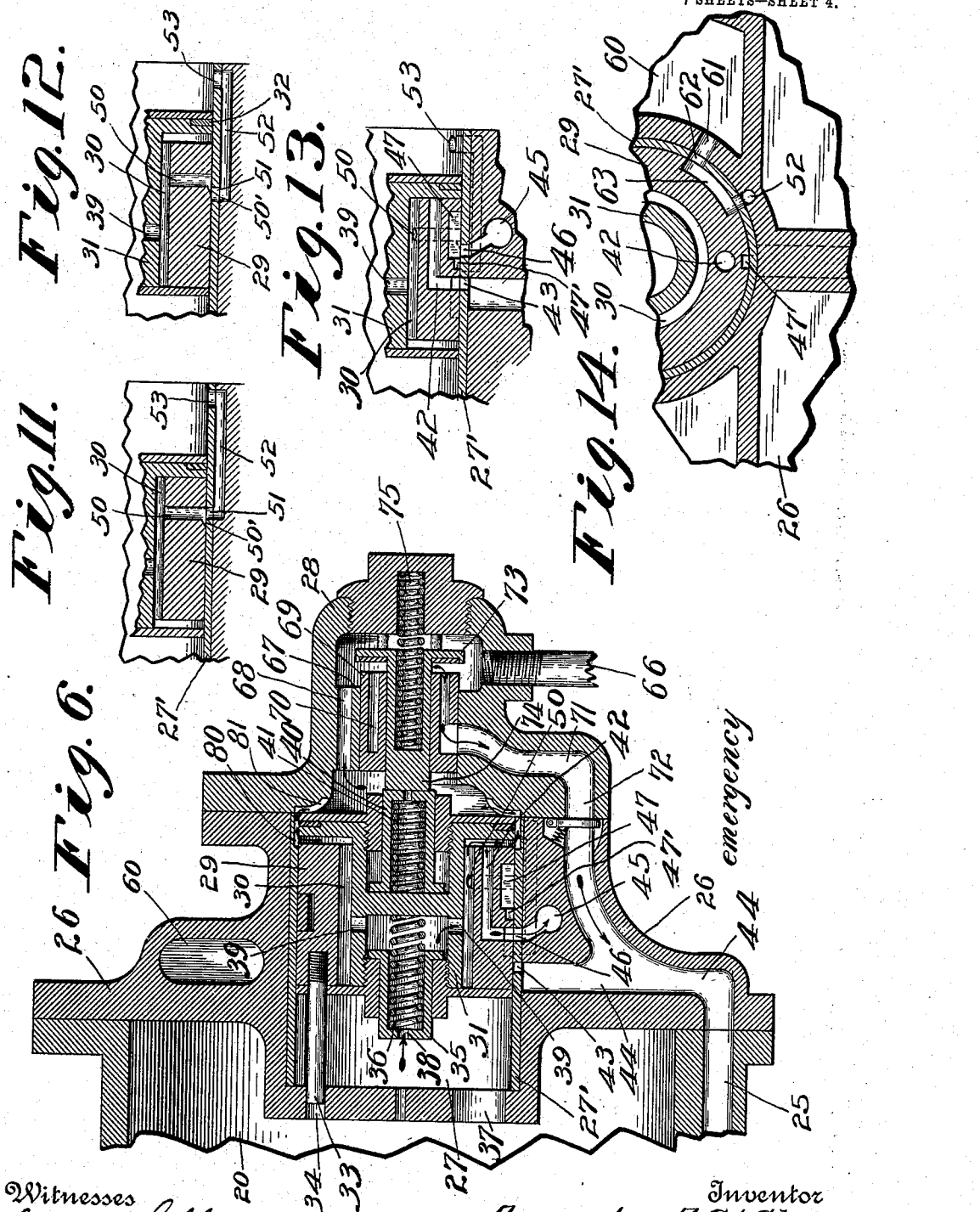

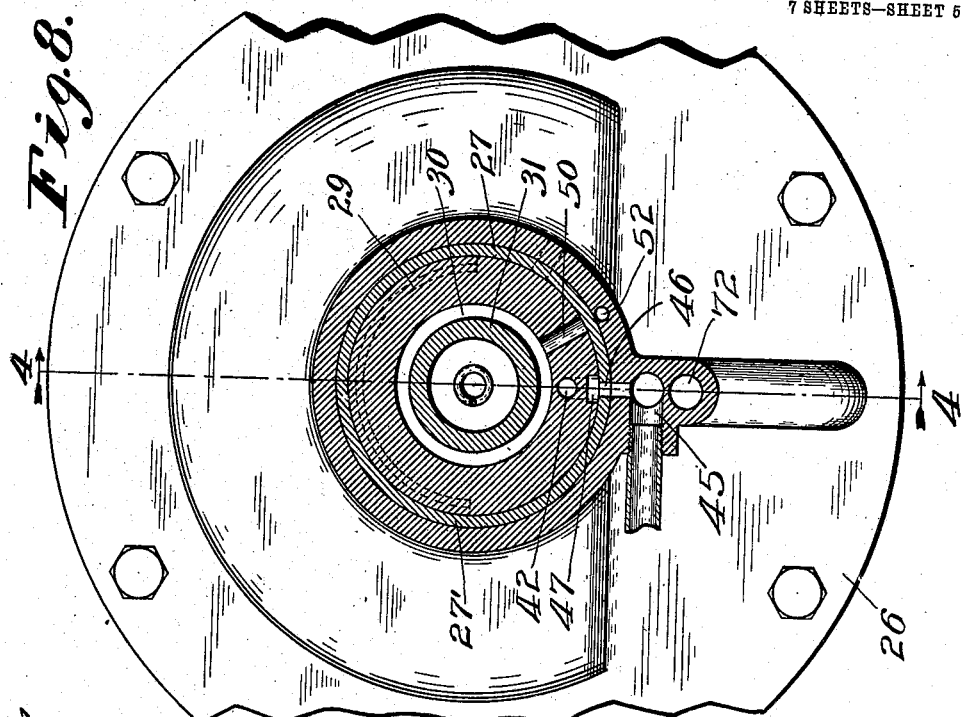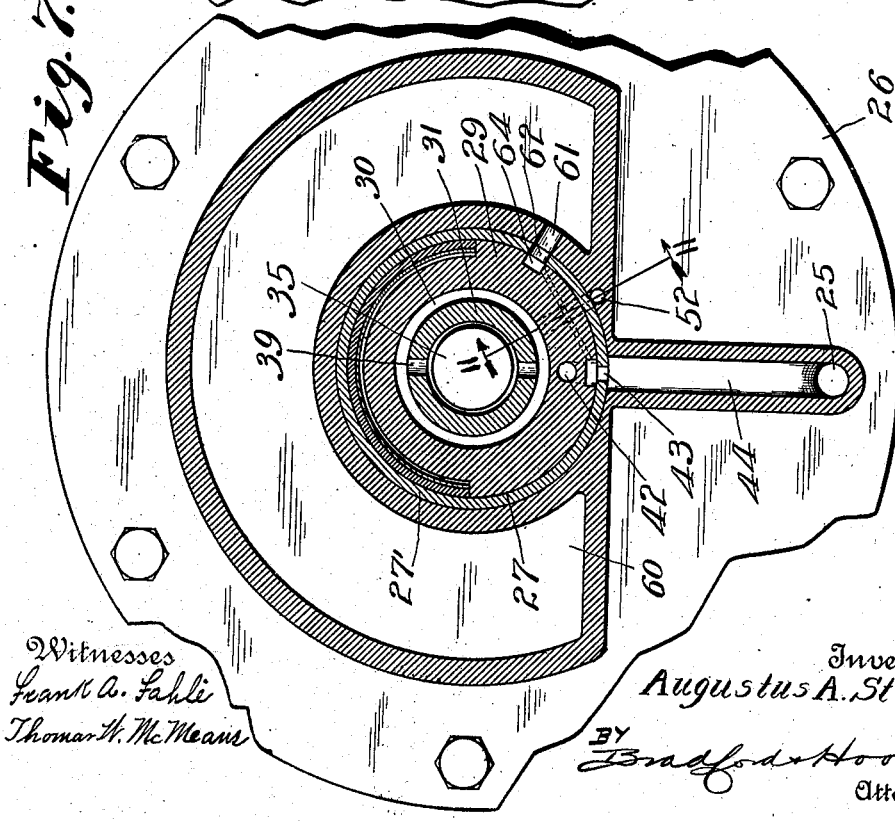

A. A. ST. CLAIR.
AIR BRAKE.
APPLICATION FILED NOV. 26, 1907.

No. 899,844.

Patented Sept. 29, 1908.
7 SHEETS—SHEET 6.

Witnesses
Frank A. Fahle
Thomas W. McMeans

Inventor
Augustus A. St Clair
BY Bradford Hood
Attorneys

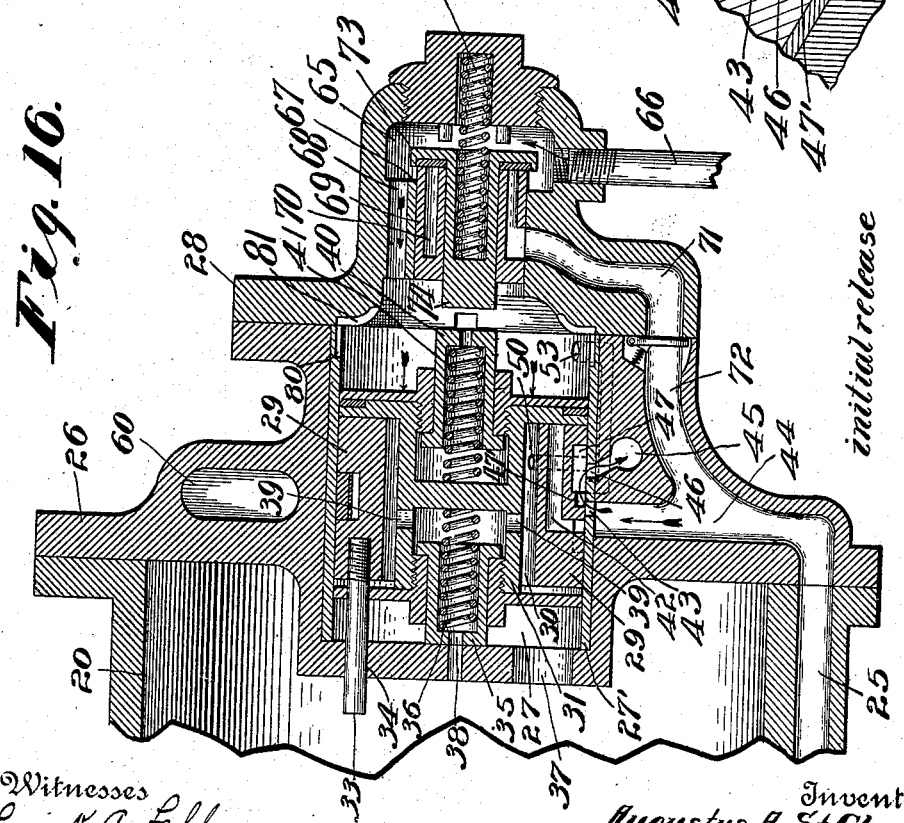

UNITED STATES PATENT OFFICE.

AUGUSTUS A. ST. CLAIR, OF INDIANAPOLIS, INDIANA, ASSIGNOR TO ST. CLAIR AIR BRAKE COMPANY, OF INDIANAPOLIS, INDIANA, A CORPORATION OF INDIANA.

AIR-BRAKE.

No. 899,844.          Specification of Letters Patent.          Patented Sept. 29, 1908.

Application filed November 26, 1907. Serial No. 403,958.

*To all whom it may concern:*

Be it known that I, AUGUSTUS A. ST. CLAIR, a citizen of the United States, residing at Indianapolis, in the county of Marion and State of Indiana, have invented certain new and useful Improvements in Air-Brakes, of which the following is a specification.

The object of my invention is to produce an improved automatic valve mechanism for air brakes, comprising means for quickly reducing the train line pressure, a predetermined and fixed amount, at each individual car immediately upon the primary reduction at the engineer's valve.

Further objects of my invention are to produce a brake controlling valve structure which shall at all times be under complete control from the engineer's valve; which shall permit a graduated brake release, and which permits a local train line reduction to atmosphere.

A further object of my invention is to provide improvements in the valve mechanism especially designed for use in conjunction with that type of air brakes described and claimed in my Patent No. 860946 issued July 23, 1907, together with such improvements in details of construction as shall be hereinafter pointed out.

Figure 10:
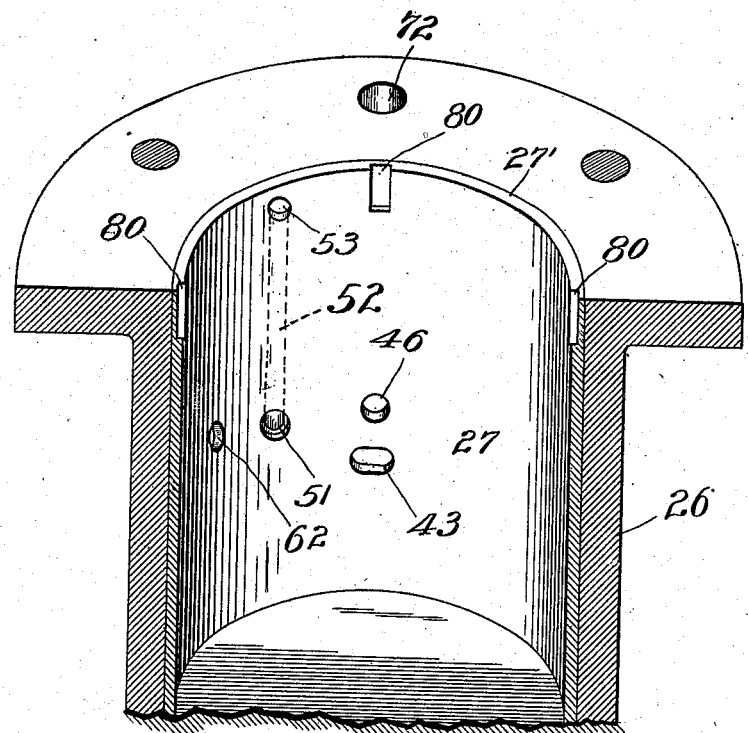
Figure 9:
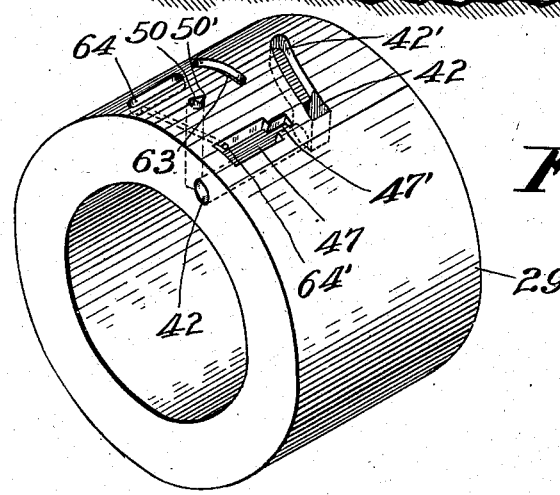

The accompanying drawings illustrate my invention:

Figure 1 is a partial vertical section of an air brake cylinder and valve mechanism embodying my invention as applied to an air brake of the type just mentioned; Fig. 2 an axial section of my improved valve mechanism in full release and charging position; Fig. 3 a similar view with the parts in running position; Fig. 4 a similar view with the parts in full first service position; Fig. 5 a similar view with the parts in full second-service position; Fig. 6 a similar view showing the parts in emergency position; Fig. 7 a transverse section on line 7—7 of Fig. 3; Fig. 8 a transverse section on line 8—8 of Fig. 3; Fig. 9 a perspective view of the valve ring showing the several ports thereof; Fig. 10 a fragmentary perspective of that portion of the valve chamber in which the several ports are formed; Fig. 11 a detail section on line 11 of Fig. 7 with the parts in full release position; Fig. 12 a view similar to Fig. 11 with the parts in running position; Fig. 13 a transverse section showing the port relations in full first-service position for transfer of pressures for the local reducing of the train line pressure to the fixed predetermined amount. Fig. 14 a transverse section through the pocket-port in first-service position. Fig. 15 a similar view showing connections between the pocket and atmosphere in running position. Fig. 16 a longitudinal section with the ports in initial graduated release position. Fig. 17 a perspective transparency showing the port arrangement for local train line exhaust to atmosphere.

In the drawings 20 and 21 indicate the primary and secondary chambers of the brake cylinder with the piston 22 mounted between the same and springs 23 mounted in chamber 21 and adapted to act upon piston 22 and force the same to braking position, the piston carrying a piston rod 24. A passage 25 forms, through the medium of the valve mechanism to be described, a connection between the chambers 20 and 21.

Thus far the structure is identical with that shown in my patent already mentioned and in general the valve mechanism for controlling the air pressures within the two chambers 20 and 21 is similar to that shown in my patent already mentioned but differs therefrom in material details. The end of chamber 20 is closed by head 26 and in this head is formed a cylindrical valve chamber 27, the outer end of which is closed by a head 28. Mounted in chamber 27 and fitting the same is a valve ring 29 which lies in a circumferential groove 30 formed in the periphery of a piston valve 31, the axial dimension of said groove being a little greater than the axial dimension of the ring and the radial dimension of the groove being greater than the radial thickness of the ring, for a purpose which will appear. The piston valve at its outer end is packed at 32. Secured in ring 29 is a pin 33 which lies parallel with the axis of the ring and extends laterally through the adjacent flange of the piston valve and also through an opening 34 through the inner head of chamber 27 so as to hold both the ring and piston-valve against rotation within the chamber 27 while permitting free axial movement. Mounted in the inner head of the piston valve 31 is a buffer plunger 35 which is normally held projected from the inner end of the piston valve by means of a spring 36 which may conveniently have a force on the buffer plunger of say 5 lbs. to the square inch of piston valve area. Free communication between the inner end of chamber 27 and chamber 20 is had through suitable openings 37 through the head of the inner end of chamber 27 and a passage 38 provides free communication through plunger 35 into the interior of the piston valve and from thence through passages 39 into groove 30 between the bottom of said groove and the inner wall of ring 29. Mounted in the outer head of the piston valve 31 is a buffer plunger 40 which is normally held projected by a spring 41 of substantially the same strength as spring 36. Formed in ring 29 is a passage 42 which, at one end, opens into the outer end of ring 29 and at its other end opens into the periphery of said ring in order to register at times with a port 43 formed through the bushing 27' which forms the wearing wall of chamber 27. Formed in head 26 is a passage 44 which extends between port 43 and passage 25. Formed in head 26 is a passage 45 which leads to atmosphere and this passage communicates with the interior of chamber 27 through a port 46 formed through bushing 27'. Formed in the periphery of ring 29 is a pocket 47 adapted, at times, to connect ports 43 and 46, said pocket having a small extension 47' at its inner end to serve in obtaining the graduated release which will be explained later. Extending radially through ring 29 is a passage 50, the outer end of which is adapted to be brought into register with a port 51 formed through bushing 27' and communicate with a passage 52 extending axially beneath said bushing, and at its outer end communicating with the port 53 formed through bushing 27' and always in communication with the outer end of chamber 27. The outer end of passage 50 at its rear side is provided with a slight restricted extension 50' which, in running positions of the parts maintains a small leakage connection between the outer end of chamber 27 and the chamber 20 of the brake cylinder through passage 52, in order to permit gradual and continuous maintenance of equal pressures in the train line and the primary pressure chamber 20 during the running. The inner end of passage 42 is extended in the periphery of ring 29, as shown at 42', Fig. 9, in order to register with port 51 when the parts are in full second service position and thus locally exhaust train line pressure in the outer end of chamber 27, and adjacent train line of the car.

For the purpose of quickly reducing the train line pressure to a first service condition, without the necessity of waiting for such reduction through the engineer's valve, I form in each head 26, a train line exhaust pocket 60 which has a capacity to receive from the train line of the particular car on which the apparatus is carried such volume of air as will reduce the pressure from running pressure to first service application pressure, this capacity being, for the present commercial structures, about 40 cubic inches, and said port 60 communicates by a passage 61 with a port 62 formed through bushing 27'. The port 62 is substantially in alinement with port 51 and formed in the periphery of ring 29 is a pocket 63 which, in running position, lies immediately adjacent the two ports 51 and 62 so that the first movement of ring 29 toward first service position from running position will cause pocket 63 to form a communication between ports 62 and 51 and permit the train line pressure within the outer end of chamber 27 to pass through passage 52 and thence into pocket 60.

Formed in the periphery of ring 29 is a pocket 64 adapted to register with port 62 when the ring 29 is in running or full release position. The reduction in pressure of the train line of a forward car into its pocket 60 immediately causes a reduction in the train of the next car to the rear enough to move its valve and immediately permit reduction of the train line pressure of said rear car into its pocket so that the action of the valves of successive cars to the rear takes place with great rapidity. In other words, there is an automatic serial reduction in an unlimited number of cars by a very slight reduction through the engineer's valve which may immediately be thrown to lap position. Leading from said pocket 64 to pocket 47 is a passage 64' through which the pressure in chamber 60 may exhaust to atmosphere when the parts have been brought back to their full release or running position.

Formed in head 28 is a chamber 65 into which the train line pipe 66 leads, and said chamber 65 has free communication with the outer end of chamber 27. Formed in chamber 65 is a medial partition 67 through which suitable openings 68 are formed to provide free communication through the partition, and mounted centrally in said partition is a bushing 69 having an annular chamber 70 which communicates with the passage 71 which communicates with the passage 72 which enters passage 44 and thence communicates with passage 25. The outer end of the annular chamber 70 opens into the outer end of chamber 65 and the valve 73 is provided to normally close communication between chamber 65 and the annular chamber 70. Valve 73 is provided with a stem 74 which extends through bushing 69 and lies in the path of movement of the buffer plunger 40. A spring 75 serves to normally hold valve 73 on its seat, said spring having a strength greater than spring 41, preferably about 10 pounds to the square inch of piston valve area. Formed in the outer end of bushing 27' are some passages 80 which extend axially into said bushing a distance a little greater than the axial thickness of the outer head of the piston valve so that when said piston valve passes to emergency position, as shown in Fig. 6, the inner ends of the passages 80 will be in communication with that portion of groove 30 of the piston valve beyond the outer end of ring 29, as clearly shown in Fig. 6. The passages 80 at their outer ends communicate, through grooves 81 formed in head 28, with chamber 65.

The operation is as follows: Assuming the parts to be under no air pressure, spring 23 will move piston 22 to the extreme of its movement, as indicated in dotted lines of Fig. 1. Train line pressure introduced through pipe 66 will pass into chamber 65 thence through passages 68 into the outer end of chamber 27 and, acting upon the outer end of the piston valve 31 will move said piston valve and the valve ring 29 to the positions shown in Fig. 2, where plunger 35 is forced back into the piston valve and spring 36 compressed. In this position pocket 47 forms a free communication between ports 43 and 46 so that chamber 21 is in free communication with the atmosphere; passage 50 is also in full communication with port 51 so that the train line pressure may pass from the outer end of chamber 27 through the port 53, passage 52, port 51, passage 50, the annular space 30 inside of ring 29, passages 39, 38 and 37, into chamber 20. At the same time pocket 64 is in register with port 62 so that chamber 60 is in free communication with the atmosphere through pocket 47 and passage 45. When the pressure within chamber 20 has reached an amount differing from train line pressure by a little less than the strength of spring 36, said spring operating through plunger 35 will automatically shift the piston valve and valve ring to the positions shown in Fig. 3, where passage 50 is shifted with relation to port 51 (as shown in Fig. 12) where the leakage passage 50' overlaps port 51. In this position there is sufficient gradual leakage through passage 50' and passage 50 from the outer end of chamber 27 into chamber 20 to gradually permit an equalization of pressures so that the pressure within chamber 20 within a comparatively short time becomes equal to train line pressure.

For an ordinary service application the engineer will open his valve and reduce train line pressure enough to cause the pressure within the inner end of chamber 27 of the first brake mechanism next the engine to shift the piston valve and its ring to the position shown in Fig. 4, and immediately throw his valve to lap. Upon this action on the first air brake mechanism of the train, the pocket 63 of the valve ring thereof will bridge between the two ports 51 and 62 and this permit a portion of the train line pressure of that particular car to pass quickly through passages 53, 52 and 51, pocket 63, port 62, and passage 61 into pocket 60, and this action of the first brake mechanism will cause suc ce sive actions of the brake mechanisms of the successive cars much more rapidly than would be possible if the entire train line pressure reduction had to be accomplished through the engineer's valve. The engineer need hold his valve open for first service position only enough to obtain the described action of the first car, the successive cars reducing train line pressure into preceding car train lines and their respective pockets 60. With the parts in position shown in Fig. 4, pressure from chamber 20 passes back through passages 37, 38, 39 and 30 to the outer end of ring 29 and from thence to the L-shaped passage 42 and port 43 into passage 44 and thence through passage 25 into the spring chamber 21, this movement of pressures continuing until the pressure in the inner end of chamber 27 is a trifle less than the reduced train line pressure in the outer end of chamber 27, whereupon the piston valve 31 is shifted to the left in Fig. 4, to the position shown in Fig. 13 thus closing the right hand end of passage 42 and preventing further movement of pressures from chamber 20 into chamber 21.

It is to be remembered that, in order to insure the movement of any valve which is subjected to pressures upon both sides, unless that valve be of the diaphragm type, a reduction of pressure upon one side of the valve must be not only sufficient in amount but must be produced with such rapidity that leakage past the valve will not be as fast as the speed of pressure reduction. The function of the pocket 60, therefore, is to provide a means of reducing train line pressure a fixed and predetermined amount and with such speed as to insure the movement of the valve from running position to first service position, so that a connection will be insured which will cause a proper application of the brakes. It is to be understood, however, that in order to obtain the best and most sensitive results, the capacity of the pocket 60 should not be enough to reduce train line pressure to such an extent that there will be a heavy application of brakes upon the slight reduction through the engineer's valve necessary to cause the use of the local pocket. In other words, the size of the ports which permit communication between pocket 60 and train line is as essential as the size of the pocket for the reason that it is speed of reduction of train line pressure which is more to be desired than quantity, the actual amount of train line reduction resulting from the use of the pocket 60 being comparatively small, while the speed of reduction is very great and the amount of reduction is not enough to produce either a full service or emergency application. It will therefore be seen that, by the arrangement shown, I am able to insure a uniform movement of all of the brake mechanisms of an unlimited number of cars. A further slight reduction of train line pressure through the engineer's valve will cause the piston valve to move again to the position shown in Fig. 4, whereupon there will be a further reduction of pressure within chamber 20, and consequently an increase of air volume in chamber 21. Upon the resumption of train line pressure the parts will move to the position shown in Fig. 2, thus exhausting the pressures from chambers 21 and 60, in the manner already described. The valve will first be driven by the resumed train-line pressure to the position shown in Fig. 16 where there will be a gradual outlet of pressure from chamber 21 through extension 47' of pocket 47 to passage 45 and atmosphere. Consequently the increasing train-line pressure will pass through the length of the train so as to shift the valve to slow release position to exhaust chambers 21 before any of the train line increase passes into the chambers 20 of forward cars. After all pressure has been exhausted from chamber 21 to atmosphere (the speed depending upon the speed of increase of train line pressure) then upon further increase of train line pressure spring 36 is further compressed and passage 50' comes into register with port 51 so that pressure is gradually admitted into the primary pressure chamber 20 in opposition to springs 23 thus continuing the gradual release of the brakes. The engineer may with great nicety graduate the release and adjust the braking force to the gradually decreasing speed of the train. It will of course be understood that the brakes may be released with great rapidity by rapidly increasing the train line pressure.

The first service position will be utilized until the pressure within chambers 20 and 21 are equalized, at which time the full force of the springs 23 will be exerted as a braking force. If a further braking force is desired, the engineer will permit a free train line reduction through his valve, whereupon the parts will move toward the position shown in Fig. 5. In this position passage 42 is brought into partial register with port 46. Pocket 63 is carried beyond register with ports 51 and 62, and plunger 40 will be pressed back into the piston valve by stem 74, the spring 75 being stronger than the spring 41. In this position the remaining pressure, or a portion thereof, in chamber 20, will pass through passage 42 into passage 45, and thence to atmosphere but, so soon as the pressure within chamber 20 is reduced to a trifle less than the combined remaining train line pressure and pressure of spring 41, the piston valve will be automatically shifted to the left from the position shown in Fig. 5 until it closes the right hand end of passage 42 and prevents further reduction of the pressure in chamber 20. The pressure within chamber 20 may, however, be entirely withdrawn to atmosphere by proper manipulation of the engineer's valve. The air pressure previously inserted in chamber 21 will assist the springs as an additional braking force. Increase of train line pressure will carry the parts back to position shown in Fig. 2 with a consequent release of the brakes as already explained.

If an emergency application is desired, the engineer will suddenly reduce his train line pressure through the emergency opening, and the piston valve will then travel suddenly to the position shown in Fig. 6, with sufficient force behind it, through the pressure in chamber 20, to compress spring 75 and unseat valve 73, whereupon the pressure within chamber 20 may pass immediately through passages 80 and 81 in chamber 65, and thence through chamber 70 and passages 71 and 72 into passage 25 and into chamber 21, causing an instantaneous equalization of air pressure between the train line pressure chamber 20 and spring chamber 21, at which time spring 75 seats valve 73. Then air passes from chamber 20 through passage 42 to atmosphere. Train line pressure also passes to atmosphere through 53, 52, 51, 42', 42 and 45. As soon as the pressure within chamber 20 is reduced to the combined remaining train line pressure and the pressure of spring 75, the parts will assume the position shown in Fig. 5 and the force exerted on the brakes will be the second service force, an action of the emergency parts merely decreasing the time in which the force of second service application is obtained.

I claim as my invention:

1. In an air-brake mechanism, the combination, with a double-ended cylinder, a brake-controlled piston mounted therein to form primary and secondary pressure chambers, a spring tending to drive the piston to brake-setting position, a train-line-exhaust pocket, and a transfer passage forming a communication between the two pressure chambers; of a valve mechanism for controlling the brake-operating piston, said valve mechanism comprising the following parts, a valve cylinder communicating with the train-line at one end and at the other end with the primary pressure chamber, said valve cylinder having a port communicating with the transfer passage, a port communicating with atmosphere, a supply port communicating with the train line end of the cylinder and a port leading to the train-line-exhaust pocket; a piston valve mounted in said valve cylinder and comprising a head member and a ring member, said ring member having a limited axial play in the head member and said ring member having a passage forming a communication between its outer end and its circumference in position to be brought into register with the transfer passage port, a pocket in the circumference of said ring member and adapted to be brought into register with the transfer passage port and the atmosphere port, also a passage extending through the ring member to communicate with its interior and at the circumference of the ring adapted to register with the train-line port, and also a pocket adapted to connect the train-line-exhaust pocket with atmosphere, and also a passage adapted to connect the said pocket with the train-line.

2. In an air-brake, a double-ended brake cylinder having a transfer passage between its ends, a brake-operating piston mounted in said cylinder, a spring yieldingly urging said piston to brake-setting position, and a train-line, of a valve subject to train-line pressure and pressure in the initial end of the brake cylinder, said valve controlling communication between train-line and the initial end of the cylinder, between the initial end of the cylinder and the transfer passage, and between atmosphere and both the transfer passage and the initial end of the cylinder, and yielding means for yieldingly resisting movement of said valve in one direction.

3. In an air brake, a double-ended brake cylinder having a transfer passage between its ends, a brake-operating piston mounted in said cylinder, a spring yieldingly urging said piston to brake-setting position, and a train-line, of a valve subject to train-line pressure and pressure in the initial end of the brake-cylinder, said valve controlling communication between train-line and the initial end of the cylinder, between the initial end of the cylinder and the transfer passage, and between atmosphere and both the transfer passage and the initial end of the cylinder, and a pair of spring pressed plungers projected from opposite ends of said valve and adapted to engage the casing at the opposite ends of the travel of said valve to yieldingly resist further movement thereof in the corresponding direction.

4. An air brake, comprising a cylinder and piston, a spring for driving the piston in one direction, and a train-line for supplying pressure to the initial end of said cylinder in opposition to the spring, a valve arranged between the train-line and initial end of the cylinder, said valve carrying a port-controlling member, and a spring plunger for normally yieldingly urging the valve from full open position toward closed position, whereby a graduated introduction of pressure from train-line to the initial end of the cylinder is insured.

5. An air brake comprising a cylinder and piston, a spring for driving the piston in one direction, and a train-line for supplying pressure to the initial end of said cylinder in opposition to the spring, a valve arranged between the train-line and initial end of the cylinder, said valve carrying a port-controlling member, and a spring plunger carried by the valve for normally yieldingly urging the valve from full open position toward closed position, whereby a graduated introduction of pressure from train-line to the initial end of the cylinder is insured.

6. An air brake comprising a cylinder and piston, a spring for driving the piston in one direction, and a train-line for supplying pressure to the initial end of said cylinder in opposition to the spring, a valve arranged between the train-line and initial end of the cylinder, said valve carrying a port-controlling member, and a pair of oppositely acting spring plungers operating to yieldingly limit the throw of the valve at its opposite ends, for the purpose set forth.

7. An air brake comprising a cylinder and piston, a spring for driving the piston in one direction, and a train-line for supplying pressure to the initial end of said cylinder in opposition to the spring, a valve arranged between the train-line and initial end of the cylinder, said valve carrying a port-controlling member, and a pair of oppositely acting spring plungers carried by the valve and operating to yieldingly limit the throw of the valve at its opposite ends, for the purpose set forth.

8. In an air brake mechanism, the combination, with a double-ended cylinder having a transfer passage between its ends, a brake-operating piston mounted in said cylinder, a spring urging said piston to brake-setting position, a train-line for supplying pressure to the initial end of the cylinder, and a train-line-exhaust pocket adapted to receive pressure from the train line, of a valve subject to train-line pressure on one side and pressure from the initial end of the cylinder on the other side, said valve carrying means for connecting the train-line with the pocket, for connecting the initial end of the cylinder with the transfer passage, for connecting the transfer passage with atmosphere, for connecting the initial end of the cylinder with atmosphere, for connecting the train-line with the initial end of the cylinder, and for connecting the pocket with atmosphere.

9. In an air brake mechanism, the combination, with a double-ended cylinder having a transfer passage between its ends, a brake-operating piston mounted in said cylinder, a spring urging said piston to brake-setting position, a train-line for supplying pressure to the initial end of the cylinder, and a train-line-exhaust pocket adapted to receive pressure from the train-line, of a valve subject to train-line pressure on one side and pressure from the initial end of the cylinder on the other side, said valve carrying means for connecting the train-line with the pocket, for connecting the initial end of the cylinder with the transfer passage, for connecting the transfer passage with atmosphere, for connecting the initial end of the cylinder with atmosphere, for connecting the train-line with the initial end of the cylinder, and for connecting the pocket with atmosphere, and means controlled by the movement of said valve for connecting the train-line directly to the transfer passage.

10. In an air brake mechanism, the combination, with a double-ended cylinder having a transfer passage between its ends, a brake-operating piston mounted in said cylinder, a spring urging said piston to brake-setting position, a train-line for supplying pressure to the initial end of the cylinder, and a train-line-exhaust pocket adapted to receive pressure from the train-line, of a valve subject to train-line pressure on one side and pressure from the initial end of the cylinder on the other side, said valve carrying means for connecting the train-line with the pocket, for connecting the initial end of the cylinder with the transfer passage, for connecting the transfer passage with atmosphere, for connecting the initial end of the cylinder with atmosphere, for connecting the train-line with the initial end of the cylinder, and for connecting the pocket with atmosphere, and means for yieldingly opposing the movement of said valve at the ends of its throw.

11. In an air brake mechanism, the combination, with a double-ended cylinder having a transfer passage between its ends, a brake-operating piston mounted in said cylinder, a spring urging said piston to brake-setting position, a train-line for supplying pressure to the initial end of the cylinder, and a train-line-exhaust pocket adapted to receive pressure from the train line, of a valve subject to train-line pressure on one side and pressure from the initial end of the cylinder on the other side, said valve carrying means for connecting the train-line with the pocket, for connecting the initial end of the cylinder with the transfer passage, for connecting the transfer passage with atmosphere, for connecting the initial end of the cylinder with atmosphere, for connecting the train-line with the initial end of the cylinder, and for connecting the pocket with atmosphere, means controlled by the movement of said valve for connecting the train-line directly to the transfer passage, and means for yieldingly opposing the movement of said valve at the ends of its throw.

12. In an air-brake system, the combination, of a train line, pressure-controlled brake-operating means, a valve subject to train-line pressure, said valve controlling an outlet from a pressure chamber of the pressure-controlled brake-operating means, and a yielding means normally limiting the movement of said valve to a position of less than maximum opening from the pressure chamber, said yielding means acting in opposition to train-line pressure on the valve, whereby increasing train-line pressure will overcome said yielding means and serve to gradually increase the outlet from the pressure chamber.

13. In an air-brake system, the combination, of a train line, a brake-controlling piston and a pressure chamber within which said piston is mounted, a valve subject to train-line pressure, said valve and pressure chamber having coöperating relatively-graduated discharge passages, and yielding means for initially limiting the movement of said valve by increased train-line pressure to a position of less than maximum release of pressure acting on the brake-controlling piston, whereby further increase of train-line pressure will overcome said yielding means and move said valve toward the maximum outlet for said pressure chamber.

14. In an air-brake system, a brake cylinder and a brake-controlling piston mounted therein to form primary and secondary pressure chambers on opposite sides of said piston; a spring for normally urging said piston toward brake-operating position; a train line for supplying pressure to the primary pressure chamber in opposition to the spring; a valve subject to train-line pressure on one side and to primary-chamber pressure on the opposite side, said valve having means controlling communication between the train line and the primary chamber, and between the primary chamber and atmosphere, and between the primary and secondary chambers, and between the secondary chamber and atmosphere; and a yielding means arranged to yieldingly oppose movement of the said valve by increased train-line pressure from a position of small secondary-chamber exhaust toward increased secondary-chamber exhaust.

15. In an air-brake system, a brake cylinder and a brake-controlling piston mounted therein to form primary and secondary pressure chambers on opposite sides of said piston; a spring for normally urging said piston toward brake-operating position; a train line for supplying pressure to the primary pressure chamber in opposition to the spring; a valve subject to train-line pressure on one side and to primary-chamber pressure on the opposite side, said valve having means controlling communication between the train line and the primary chamber, and between the primary chamber and atmosphere, and between the primary and secondary chambers, and between the secondary chamber and atmosphere; and a spring plunger carried by said valve and arranged to yieldingly oppose movement of said valve by increased train-line pressure from a position of small secondary-chamber exhaust toward increased secondary-chamber exhaust.

16. In an air-brake system, a brake cylinder and a brake-controlling piston mounted therein to form primary and secondary pressure chambers on opposite sides of said piston; a spring for normally urging said piston toward brake-operating position; a train line for supplying pressure to the primary pressure chamber in opposition to the spring; a valve subject to train-line pressure on one side and to primary-chamber pressure on the opposite side, said valve having means controlling communication between the train line and the primary chamber, and between the primary chamber and atmosphere, and between the primary and secondary chambers, and between the secondary chamber and atmosphere; a spring plunger carried by said valve and arranged to yieldingly oppose movement of said valve by increased train-line pressure from a position of small secondary-chamber exhaust toward increased secondary-chamber exhaust, and a yielding means arranged to yieldingly oppose movement of said valve by primary-chamber pressure to the position of primary-chamber exhaust to atmosphere.

17. In an air-brake system, a brake cylinder and a brake-controlling piston mounted therein to form primary and secondary pressure chambers on opposite sides of said piston; a spring for normally urging said piston toward brake-operating position; a train line for supplying pressure to the primary pressure chamber in opposition to the spring; a valve subject to train-line pressure on one side and to primary-chamber pressure on the opposite side, said valve having means controlling communication between the train line and the primary chamber, and between the primary chamber and atmosphere, and between the primary and secondary chambers, and between the secondary chamber and atmosphere; a spring plunger carried by said valve and arranged to yieldingly oppose movement of said valve by increased train-line pressure from a position of small secondary-chamber exhaust toward increased secondary-chamber exhaust, and a yielding means arranged to yieldingly oppose movement of said valve by primary-chamber pressure to the position of primary-chamber exhaust to atmosphere and local exhaust of train-line pressure to atmosphere.

18. In an air-brake system, a brake cylinder and a brake-controlling piston mounted therein to form primary and secondary pressure chambers on opposite sides of said piston; a spring for normally urging said piston toward brake-operating position; a train line for supplying pressure to the primary pressure chamber in opposition to the spring; a valve subject to train-line pressure on one side and to primary-chamber pressure on the opposite side, said valve having means controlling communication between the train line and the primary chamber, and between the primary chamber and atmosphere, and between the primary and secondary chambers, and between the secondary chamber and atmosphere; a spring plunger carried by said valve and arranged to yieldingly oppose movement of said valve by increased train-line pressure from a position of small secondary-chamber exhaust toward increased secondary-chamber exhaust, and a spring plunger carried by said valve and arranged to yieldingly oppose movement of the valve by primary-chamber pressure to the position of primary-chamber exhaust to atmosphere.

19. In an air-brake system, a brake-cylinder and a brake-controlling piston mounted therein to form primary and secondary pressure chambers on opposite sides of said piston; a spring for normally urging said piston toward brake-operating position; a train line for supplying pressure to the primary pressure chamber in opposition to the spring; a valve subject to train-line pressure on one side and to primary-chamber pressure on the opposite side, said valve having means controlling communication between the train line and the primary chamber, and between the primary chamber and atmosphere, and between the primary and secondary chambers, and between the secondary chamber and atmosphere; a spring plunger carried by said valve and arranged to yieldingly oppose movement of said valve by increased train-line pressure from a position of small secondary-chamber exhaust toward increased secondary chamber exhaust, and a spring plunger carried by said valve and arranged to yieldingly oppose movement of the valve by primary-chamber pressure to the position of primary chamber exhaust to atmosphere, and local exhaust of train-line pressure to atmosphere.

20. In an air-brake system, a brake cylinder and a brake controlling piston mounted therein to form primary and secondary pressure chambers on opposite sides of said piston; a spring for normally urging said piston toward brake-operating position; a train-line for supplying pressure to the primary pressure chamber in opposition to said spring; a valve subject to train-line pressure on one side and to primary-chamber pressure on the other side, said valve having means controlling communication between the train-line and the primary-chamber and between the primary-chamber and atmosphere, and between the primary and secondary chambers, and between the secondary-chamber and atmosphere; a local exhaust for train-line; a yielding means arranged to yieldingly oppose movement of the said valve by increased train-line pressure from a position of small secondary-chamber exhaust toward increased secondary-chamber exhaust, and yielding means arranged to yieldingly oppose movement of said valve by primary-chamber pressure to the position of primary-chamber exhaust to atmosphere and local train-line exhaust.

21. In an air-brake system, a brake cylinder and a brake controlling piston mounted therein to form primary and secondary pressure chambers on opposite sides of said piston; a spring for normally urging said piston toward brake operating position; a train-line for supplying pressure to the primary pressure chamber in opposition to said spring; a valve subject to train-line pressure on one side and to primary-chamber pressure on the other side, said valve having means controlling communication between the train-line and the primary-chamber and between the primary-chamber and atmosphere, and between the primary and secondary chambers, and between the secondary-chamber and atmosphere; a local exhaust for train-line; and a pair of oppositely acting spring plungers carried by said valve, one of said plungers arranged to yieldingly oppose movement of the valve by primary-chamber pressure to the position of primary-chamber exhaust to atmosphere and local train-line exhaust, and the other of said plungers arranged to yieldingly oppose movement of said valve by increased train-line pressure from a position of small secondary-chamber exhaust toward increased secondary-chamber exhaust.

22. In an air-brake system, a brake cylinder and a brake-controlling piston mounted therein to form primary and secondary pressure chambers on opposite sides of said piston, a spring for normally urging said piston toward brake-operating position; a train-line for supplying pressure to the primary pressure chamber in opposition to the spring; a valve subject to train-line pressure on one side and primary-chamber pressure on the opposite side, said valve having means controlling communication between the train-line and the primary-chamber, and between the primary-chamber and atmosphere, and between the primary and secondary chambers, and between the secondary-chamber and atmosphere, and a train-line exhaust to atmosphere, and a local exhaust from train-line to a reducing pocket, and from reducing pocket to atmosphere, substantially as and for the purpose set forth.

23. In an air-brake system, a brake cylinder and a brake-controlling piston mounted therein to form primary and secondary pressure chambers on opposite sides of said piston, a spring for normally urging said piston toward brake-operating position; a train-line for supplying pressure to the primary pressure chamber in opposition to the spring; a valve subject to train-line pressure on one side and primary-chamber pressure on the opposite side, said valve having means controlling communication between the train-line and the primary-chamber, and between the primary-chamber and atmosphere, and between the primary and secondary chambers, and between the secondary-chamber and atmosphere, and a train-line exhaust to atmosphere, and a local exhaust from train-line to a reducing pocket, and from said reducing pocket to atmosphere, and yielding means arranged to yieldingly oppose movement of said valve in each direction at opposite ends of its stroke.

24. In an air-brake system, a brake cylinder and a brake controlling piston mounted therein to form primary and secondary pressure chambers on opposite sides of said piston, a spring for normally urging said piston toward brake-operating position; a train-line for supplying pressure to the primary pressure chamber in opposition to the spring; a valve subject to train-line pressure on one side and primary-chamber pressure on the opposite side, said valve having means controlling communication between the train-line and the primary-chamber, and between the primary-chamber and atmosphere, and between the primary and secondary chambers, and between the secondary-chamber and atmosphere, and a train-line exhaust to atmosphere, and a local exhaust from train-line to a reducing pocket, and from said reducing pocket to atmosphere, and a pair of spring plungers carried by said valve and operating in opposite directions to yieldingly oppose movement of said valve at the ends of its stroke.

25. In an air-brake mechanism, the combination, with a double-ended cylinder, a brake-controlled piston mounted therein to form primary and secondary pressure chambers, a spring tending to drive the piston to brake-setting position, a train-line-exhaust pocket, and a transfer passage forming a communication between the two pressure chambers; of a valve mechanism for controlling the brake-operating piston, said valve mechanism comprising the following parts, a valve cylinder communicating with the train-line at one end and at the other end with the primary pressure chamber, said valve cylinder having a port communicating with the transfer passage, a port communicating with atmosphere, a supply port communicating with the train line end of the cylinder and a port leading to the train-line-exhaust pocket; a piston valve mounted in said valve cylinder and comprising a head member and a ring member, said ring member having a limited axial play in the head member and said ring member having a passage forming a communication between its outer end and its circumference in position to be brought into register with the transfer passage port, a pocket in the circumference of said ring member and adapted to be brought into register with the transfer passage port and the atmosphere port, also a passage extending through the ring member to communicate with its interior and at the circumference of the ring adapted to register with the train-line port, and also a pocket adapted to connect the train-line-exhaust pocket with atmosphere, and also a passage adapted to connect the said pocket with the train-line, and a spring-closed emergency valve controlling communication between the train line and the secondary pressure chamber, said emergency valve lying in the path of movement of the piston valve.

26. In an air-brake mechanism, the combination, with a double-ended cylinder, a brake-controlled piston mounted therein to form primary and secondary pressure chambers, a spring tending to drive the piston to brake-setting position, a train-line-exhaust pocket, and a transfer passage forming a communication between the two pressure chambers; of a valve mechanism for controlling the brake-operating piston, said valve mechanism comprising the following parts, a valve cylinder communicating with the train-line at one end and at the other end with the primary pressure chamber, said valve cylinder having a port communicating with the transfer passage, a port communicating with atmosphere, a supply port communicating with the train line end of the cylinder and a port leading to the train-line-exhaust pocket; a piston valve mounted in said valve cylinder and comprising a head member and a ring member, said ring member having a limited axial play in the head member and said ring member having a passage forming a communication between its outer end and its circumference in position to be brought into register with the transfer passage port, a pocket in the circumference of said ring member and adapted to be brought into register with the transfer passage port and the atmosphere port, also a passage extending through the ring member to communicate with its interior and at the circumference of the ring adapted to register with the train-line port, and also a pocket adapted to connect the train-line-exhaust pocket with atmosphere, and also a passage adapted to connect the said pocket with the train-line, and a spring-closed emergency valve controlling communication between the train line and the secondary pressure chamber, said emergency valve lying in the path of movement of the piston valve and the piston valve cylinder having passages 80—81 forming a communication between the primary pressure chamber and the train-line when the emergency valve is opened by the piston valve.

27. In an air-brake, a double-ended brake cylinder having a transfer passage between its ends, a brake-operating piston mounted in said cylinder, a spring yieldingly urging said piston to brake-setting position, and a train-line, of a valve subject to train-line pressure and pressure in the initial end of the brake-cylinder, said valve controlling communication between train-line and the initial end of the cylinder, between the initial end of the cylinder and the transfer passage, and between atmosphere and both the transfer passage and the initial end of the cylinder, yielding means for yieldingly resisting movement of said valve in one direction, and a spring-closed emergency valve arranged in the path of movement of the first mentioned valve and adapted to control communication between the train-line and the farther end of the brake cylinder.

28. In an air brake, a double-ended brake cylinder having a transfer passage between its ends, a brake-operating piston mounted in said cylinder, a spring yieldingly urging said piston to brake-setting position, and a train-line, of a valve subject to train-line pressure and pressure in the initial end of the brake-cylinder, said valve controlling communication between train-line and the initial end of the cylinder, between the initial end of the cylinder and the transfer passage, and between atmosphere and both the transfer passage and the initial end of the cylinder, a pair of spring pressed plungers projected from opposite ends of said valve and adapted to engage the casing at the opposite ends of the travel of said valve to yieldingly resist further movement thereof in the corresponding direction, an emergency valve arranged to control communication between the train-line and the farther end of the cylinder and also arranged in the path of movement of one of said spring plungers, and a spring for normally closing said emergency valve, said spring being stronger than the spring of the coöperating plunger.

29. An air brake comprising a cylinder and piston, a spring for driving the piston in one direction, and a train-line for supplying pressure to the initial end of said cylinder in opposition to the spring, a valve arranged between the train-line and initial end of the cylinder, said valve carrying a port-controlling member, a pair of oppositely acting spring plungers carried by the valve and operating to yieldingly limit the throw of the valve at its opposite ends, an emergency valve arranged to control communication between the train-line and the farther end of the cylinder and also arranged in the path of movement of one of said spring plungers, and a spring for normally closing said emergency valve, said spring being stronger than the spring of the coöperating plunger.

In witness whereof, I, have hereunto set my hand and seal at Indianapolis, Indiana, this twentieth day of November, A. D. one thousand nine hundred and seven.

AUGUSTUS A. ST. CLAIR. [L. S.]

Witnesses:
ARTHUR M. HOOD,
THOMAS W. McMEANS